United States Patent [19]

Chynoweth et al.

[11] 3,859,664

[45] Jan. 7, 1975

[54] BATCH FABRICATED THIN-FILM TRANSDUCERS HAVING A COMMON POLE WITH TUNNEL ERASE POLES AND A PLURALITY OF READ/WRITE POLES

[75] Inventors: William R. Chynoweth; Wolfgang Kayser, both of Oklahoma City, Okla.

[73] Assignee: Honeywell Information Systems, Inc., Waltham, Mass.

[22] Filed: July 9, 1973

[21] Appl. No.: 377,684

[52] U.S. Cl. .................... 360/121, 360/118

[51] Int. Cl. .................... G11b 5/26, G11b 5/27

[58] Field of Search .............. 179/100.2 C, 100.2 D; 340/174.1 F; 346/74 MC; 360/118, 121

[56] References Cited

UNITED STATES PATENTS

| | | | |
|---|---|---|---|
| 3,132,214 | 5/1964 | Welsh | 179/100.2 C |
| 3,344,237 | 9/1967 | Gregg | 179/100.2 C |
| 3,514,851 | 6/1970 | Perkins et al. | 179/100.2 C |
| 3,579,214 | 5/1971 | Solyst | 179/100.2 C |
| 3,619,514 | 11/1971 | Barcaro | 179/100.2 C |
| 3,639,699 | 2/1972 | Tiemann | 179/100.2 C |
| 3,668,332 | 6/1972 | Anderson | 179/100.2 C |

OTHER PUBLICATIONS

Davy, "Batch Fabricated Tunnel Erase Head," IBM Tech. Disc. Bull., Vol. 15, No. 6, Nov. 1972, p. 2036.

*Primary Examiner*—Stanley M. Urynowicz, Jr.
*Assistant Examiner*—Robert S. Tupper
*Attorney, Agent, or Firm*—Edward W. Hughes

[57] ABSTRACT

A plurality of thin film transducers are batch fabricated in two rows with a continuous pole which is common to both rows of transducers extending through all of the transducers. One row of transducers includes individual read/write poles which are mounted on one side of the common pole. The second row of transducers has a plurality of tunnel erase poles mounted on the other side of the common pole. Each adjacent pair of read/write transducers has a single common connection terminal or "shared terminal" mounted between them. The tunnel erase poles eliminate any signals which may be recorded in the space between the read/write transducers.

6 Claims, 9 Drawing Figures

BATCH FABRICATED THIN-FILM TRANSDUCERS HAVING A COMMON POLE WITH TUNNEL ERASE POLES AND A PLURALITY OF READ/WRITE POLES

BACKGROUND OF THE INVENTION

This invention relates to an array of thin film magnetic transducers and more particularly to an array having tunnel erase poles. A plurality of thin-film read/write transducers are mounted in a row with a single connection terminal between each pair of adjacent transducers. A common pole extends through all of the transducers with individual read/write poles mounted on one side of the common pole and tunnel erase poles mounted on the other side of the common pole.

In high speed data processing systems data is stored on magnetic tape or magnetic disks for retrieval and use at a later time. It is important that large quantities of data be stored as compactly as possible to minimize the number of reels of tape or the number of disks used with the data processing system. It is also important that data be located on the magnetic medium and retrieved as quickly as possible while the data is being processed. In order to do this magnetic disks may use a large plurality of tracks of data with a read/write head positioned over each of the tracks. Such read/write heads must be very small when a large number of tracks are used, and the heads and connecting circuits must be rugged and dependable. Stray magnetic flux from the read/write heads and variations in head-to-disk position may cause previously recorded data to remain between adjacent tracks when new data is recorded on the disk. In prior art magnetic disk special tunnel erase transducers are provided to erase residue signals between adjacent tracks to prevent these residue signals from introducing errors into the newly recorded data. These prior art tunnel erase transducers are a separate appendage to the standard read/write transducers causing the head array to be bulky.

The present invention alleviates some of the disadvantages of the prior art by using thin-film technology to provide a common pole which is used with both read/write poles and with tunnel erase poles to form both read/write transducers and tunnel erase transducers which are much more compact than prior art transducers using separate poles. Thin-film magnetic transducers using the present invention may be made so small that more than one hundred tracks per inch are recorded on the magnetic disk using an in-line multiple transducer head.

It is, therefore, and object of this invention to provide improved multitrack thin-film magnetic recording heads.

Another object of this invention is to provide means for reducing the crosstalk in a multitrack thin-film recording head.

A further object of this invention is to provide means for reducing noise when using a multitrack thin-film recording head.

Still another object of this invention is to provide multitrack thin-film recording heads having an increased number of tracks without having crosstalk due to recordings in the inter-track region.

Another object of this invention is to provide tunnel erase with a minimum of film layers.

Still another object of this invention is to provide tunnel erase with a minimum of complication in design and fabrication.

A further object of this invention is to provide a conductor geometry in a thin-film multitrack head which will minimize the pick up of intertrack residual signals.

SUMMARY OF THE INVENTION

The foregoing objects are achieved in the present invention by employing a plurality of discrete thin-film transducer poles which are mounted in two rows with a common pole extending between the rows. A row of individual read/write poles are mounted or deposited on one side of the common pole and a row of individual tunnel erase poles are mounted or deposited on the other side of the common pole. Each of the discrete poles are mounted or deposited opposite a section of the common poles extending between the two rows of discrete poles. The tunnel erase poles eliminate residual signals recorded between adjacent tracks.

Other objects and advantages of this invention will become apparent from the following description when taken in connection with the accompanying drawings.

DESCRIPTION OF THE PREFERRED EMBODIMENT

Figure 1:
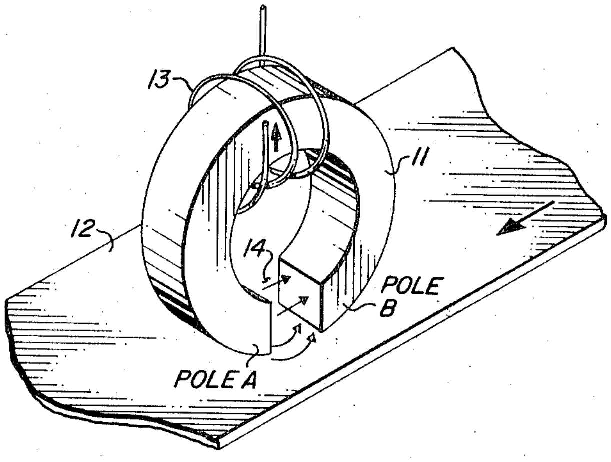
FIGS. 1–4 illustrate read/write heads or transducers which may be used to record data on a magnetic medium.
Figure 2:
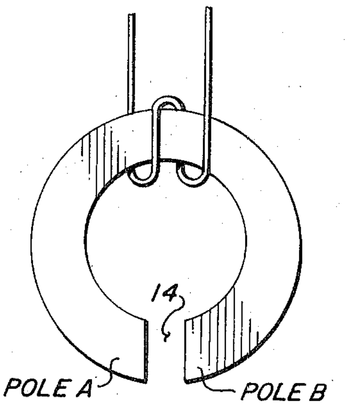
Figure 3:
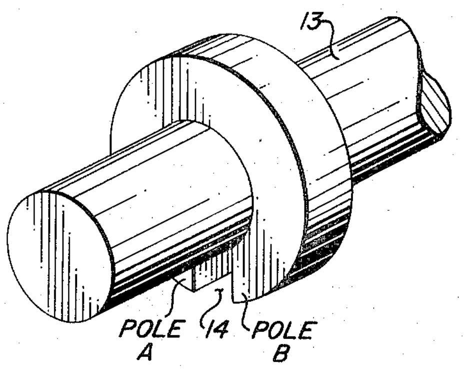
Figure 4:
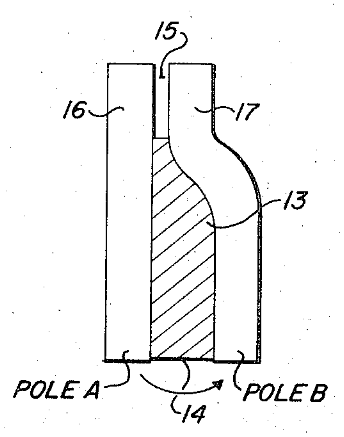

FIGS. 1–4 illustrate transducers which may be used to record information on a magnetic medium and to retrieve the recorded information from the magnetic medium. For example, FIG. 1 illustrates a ring made from a magnetic substance or a magnetic material 11 having a pole A and a pole B mounted adjacent a moving magnetic medium 12. Current in a conductor 13 produces a magnetic flux which flows through the magnetic material 11 and across the front air gap 14 between poles A and B. A portion of the flux between poles A and B flows through the magnetic medium 12 thereby polarizing the particles in the magnetic medium and recording data in the form of a pattern of magnetic polarization in the magnetic medium 12. When the polarized magnetic medium 12 is again moved past the air gap 14 the magnetized particles in the magnetic medium 12 produce a magnetic flux in the magnetic material 11. The changing flux in magnetic material 11 is coupled to the conductor thereby producing a voltage across the turns of the conductor 13. Conductor 13 may be a coil as shown in FIG. 1 or a single conductor as shown in FIGS. 2–4. Magnetic heads having a single turn of the conductor may be formed in the shape of a magnetic doughnut with an airgap as shown in FIG. 3 and having a wire running through the hole in the doughnut or it may be formed by depositing thin-film magnetic materials on a substrate to produce a magnetic head of the type shown in FIG. 4. The magnetic head shown in FIG.

4 may be constructed by depositing a first magnetic film 16 on an insulator or a substrate (not shown), then depositing the conductor 13 on the magnetic film 16 and later depositing a second magnetic film 17 on the conductor and on one edge of the first magnetic film 16. Insulating material may be deposited between conductor 13 and the magnetic films or the insulating material may be omitted as shown. A space or back gap 15 may be between film 16 and film 17 or film 16 may be adjacent film 17 without a back gap. Current flowing through the conductor produces a magnetic flux between poles A and B as shown in FIG. 4.

Figure 5:
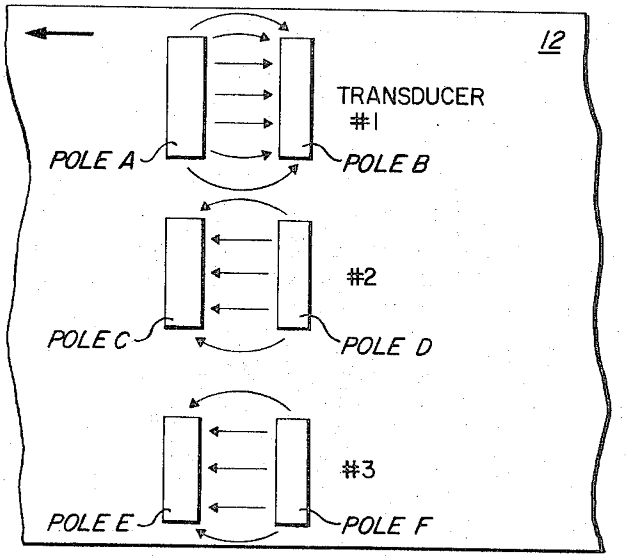
FIG. 5 illustrates a plurality of magnetic read/write heads which may be used to record several tracks of data on a single magnetic medium.

FIG. 5 shows a bottom view of the discrete thin-film magnetic transducers with two magnetic transducers positioned adjacent the magnetic medium 12. As the magnetic medium 12 moves the magnetic flux in head No. 1 records information in a track or path on the magnetic medium which passes immediately adjacent head No. 1. When the tracks are close together as shown in FIG. 5 if there is some variation in alignment between the heads and the disk some of the "stray" magnetic flux from head No. 1 may cause information from head No. 1 to be recorded in a portion of track No. 2. Some of the stray flux from head No. 2 may also cause information from head No. 2 to be recorded in track No. 1. In addition, there may be a residue signal due to failure of a new recording to erase all of a previous recording near the edge of a track. This can cause errors in the data which is recorded on the magnetic medium 12.

Figure 6:
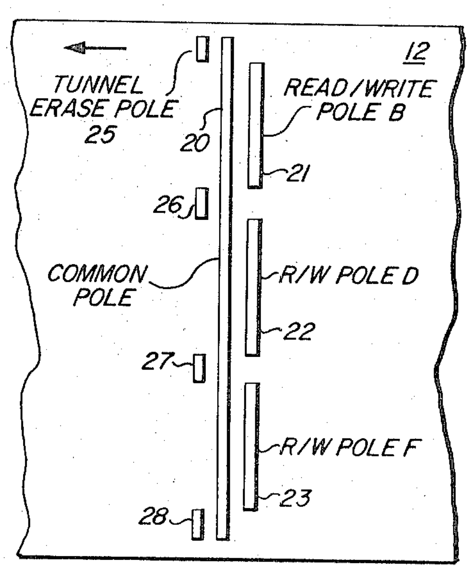
FIG. 6 illustrates one embodiment of the present invention showing the pole-tips as viewed from the magnetic medium.
Figure 7A:
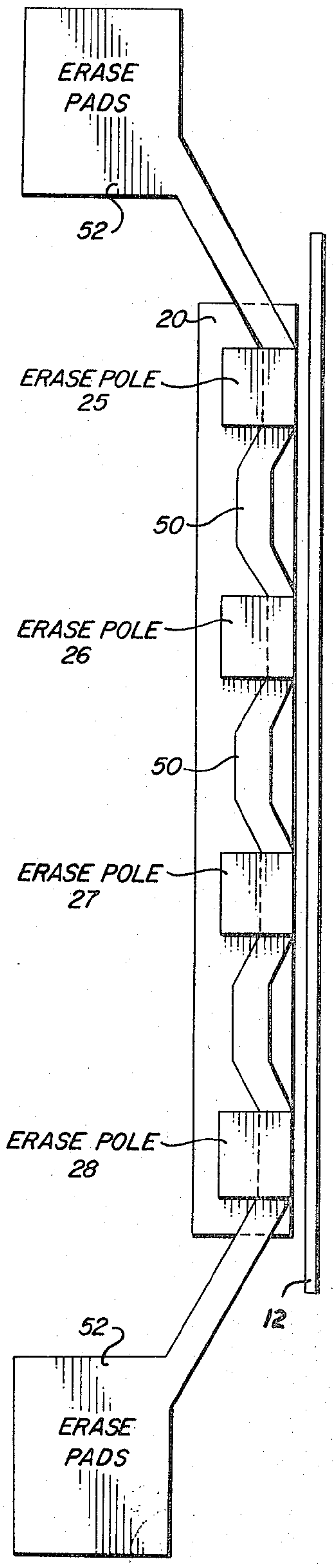
FIGS. 7*a*–7*c* illustrate details of the embodiment shown in FIG. 6.
Figure 7B:
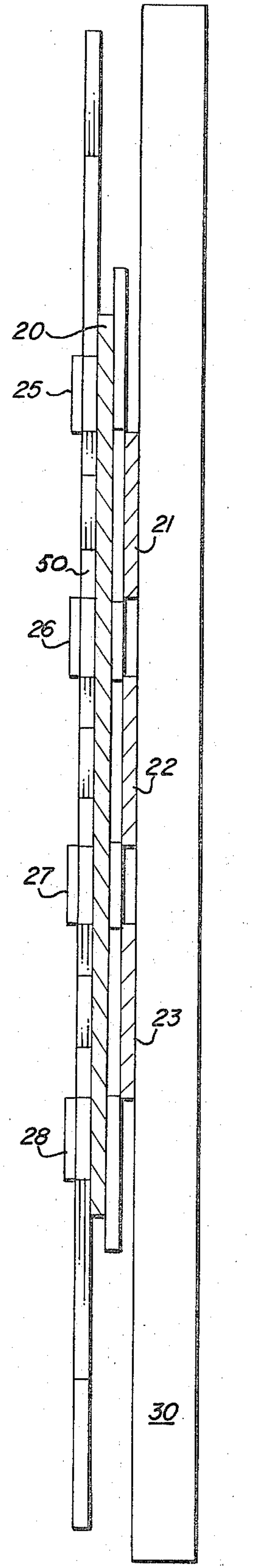
Figure 7C:
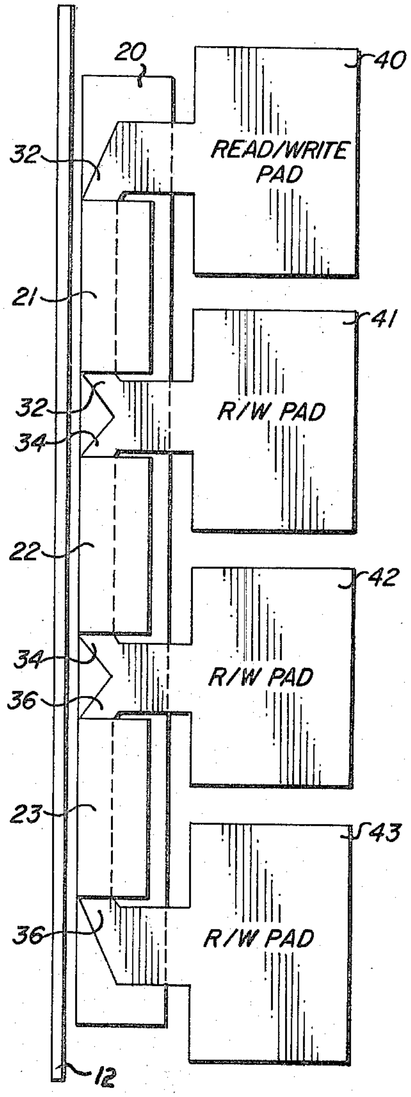

FIG. 6 illustrates an embodiment of the present invention wherein tunnel erase transducers eliminate unwanted residual signals between tracks. This prevents the residual signals from being "picked up" by an adjacent read/write transducer and allows the distance between tracks on the magnetic medium to be very small. The poles A, C and E of FIG. 5 have been merged into a common pole 20 shown in FIG. 6. The discrete poles determine the location and spacing of the data tracks. In both FIGS. 5 and 6 the conductors are not shown to better illustrate placement of the poles. In actual construction there would be a first conductor between the common pole 20 and read/write pole 21 of FIG. 6, a second conductor between common pole 20 and read/write pole 22 and a third conductor between common pole 20 and the read/write pole 23. These conductors between the read/write poles may be built as a single continuous conductor with a tap or shared terminal between each pair of read/write poles or independent connections can be provided for each transducer. As shown in FIG. 6, another group of heads is formed between the common pole 20 and the tunnel erase poles 25–28. Another conductor (not shown) would be included between each of the tunnel erase poles 25–28 and the common pole 20. The tunnel erase conductors may be connected in series with a terminal at each end of the array. If independent control of the tunnel erase conductor is desired, they can be connected in the same manner as described for the read/write transducers. The current through these erase conductors produces a flux between each of the tunnel erase poles 25–28 and the common pole 20. This flux can be used to erase the residual magnetization which is produced between the read/write tracks. Thus, a narrow tunnel or strip between the read/write heads is erased by the erase heads which are composed of the tunnel erase poles, the common pole 20 and the conductors.

FIGS. *7a*, *7b* and *7c* illustrate details of the construction of one embodiment of the heads which includes a plurality of read/write transducers and a plurality of tunnel erase transducers. FIG. *7b* illustrates the arrangement of the poles and conductors which are deposited on the substrate 30. FIG. 6 and FIG. *7b* each illustrate the poles as seen from the magnetic medium 12. FIG. *7a* illustrates the view from the left side of FIG. *7b* and FIG. *7c* illustrates the view as seen from the right side of FIG. *7b* with the substrate removed.

As seen in FIG. *7b* the read/write poles 21–23 are deposited on the substrate 30. The read/write conductor 32 is then deposited on the read/write poles followed by the common pole 20. The erase conductor 50 is deposited on the common pole 20 and the erase poles 25–28 are deposited on the erase conductor. The erase conductor 50 is connected to a pair of erase pads or connectors 52 and 53. A D.C. erase current is supplied between the erase pads 52 and 53 to provide a magnetic field between each of the erase poles 25–28 and the common pole 30. As the magnetic medium moves from right to left across the transducer shown in FIG. *7b*, the read/write poles 21–23 record tracks of information on the magnetic medium. The erase poles 25–28 then erase a narrow band or tunnel between each of the tracks on the magnetic medium. The width of the track for read/write and the width of the tunnel erase are determined by the width of the read/write poles and the tunnel erase poles respectively. The erase conductor 50 is positioned near the magnetic medium 12 in the area of the erase poles, but conductor 50 is positioned away from the magnetic medium between the erase poles. The greater distance between conductor 50 and the medium reduces the effect which current through the conductor may have on the polarization of particles in the track area between the erase poles.

Connection to the conductors 32–36 of the read/write conductor is made on the pads or connection terminals. Each of the pads between the read/write poles is connected to the conductors for two of the recording heads. For example, pad 41 is connected to conductor 32 of read/write pole 21 and to conductor 34 of read/write head 22. Prior art transducers use a separate pad for each end of each of the conductors. Connecting a single pad to the ends of two conductors as shown in FIG. *7c* increases the amount of current that the conductor between the read/write poles can carry without increasing the distance between these poles. Thus, the array of read/write transducers and erase transducers can be compact and the conductors can still carry relatively large values of current. The illustrative embodiment of FIGS. 6, *7a*, *7b* and *7c* show three read/write transducers and four erase transducers but it should be understood that a greater or lesser number may be used.

While the principles of the invention have now been made clear in an illustrative embodiment, there will be many obvious modifications of the structure, proportions, materials and components without departing from those principles. The appended claims are intended to cover any such modifications.

What is claimed is:

1. A multitrack recording head having a plurality of transducers for use with a moveable magnetic medium, said recording head comprising:

a substrate;

a common magnetic pole;

a plurality of magnetic read/write poles, said read/-write poles being mounted in a row on said substrate with a space between each of said read/write poles, said common pole being mounted adjacent to each of said read/write poles, with each of said read/write poles being in a series magnetic relation with a portion of said common pole;

a plurality of read/write conductors, each of said read/write conductors being inductively coupled to a portion of said common pole and to a corresponding one of said read/write poles, each of said read/write conductors being mounted between a portion of said common pole and the corresponding one of said read/write poles;

a magnetic material, a portion of said material being connected between said common pole and a corresponding one of each of said read/write poles to form a plurality of read/write transducers each having a gap defined by said read/write conductor adjacent said magnetic medium;

a plurality of erase poles, said erase poles being mounted in a row adjacent said common pole with said common pole between said row of erase poles and said row of read/write poles, said erase poles being spaced so that each portion of the magnetic medium which moves past the space between the read/write poles, moves past a corresponding one of said erase poles;

an erase conductor, said erase conductor being mounted between said common pole and each of said erase poles; and a magnetic substance, a portion of said substance being connected between said common pole and a corresponding one of each of said erase poles to form a plurality of erase transducers each having a gap defined by said erase conductor adjacent to said magnetic medium.

2. A multitrack recording head as defined in claim 1 wherein:

said read/write poles are mounted to record data in a plurality of tracks on said medium; and said erase poles are mounted to erase areas between said tracks.

3. A multitrack recording head as defined in claim 1 including:

a plurality of connection terminals, a first of said connection terminals being connected to a first end of a first of said read/write conductors, a second end of said first read/write conductor and a first end of a second read/write conductor being connected to a second of said connection terminals, a second end of said second read/write conductor and a first end of a third read/write conductor being connected to a third of said connection terminals, a fourth of said connection terminals being connected to a second end of said third read/write conductor.

4. A multitrack recording head as defined in claim 1 wherein:

said erase conductor is formed to be adjacent said medium in the area adjacent to said erase poles and said erase conductor is spaced away from said medium between said erase poles.

5. A multitrack recording head having a plurality of transducers for use with a movable magnetic medium, said recording head comprising:

a substrate;

a common magnetic pole;

a plurality of magnetic read/write poles, said read/-write poles being mounted in a row on said substrate with a space between each of said read/write poles, said common pole being mounted adjacent to each of said read/write poles, with each of said read/write poles being in a series magnetic relation with a portion of said common pole;

a plurality of read/write conductors, each of said read/write conductors being inductively coupled to a portion of said common pole and to a corresponding one of said read/write poles, each of said read/write conductors being mounted between a portion of said common pole and the corresponding one of said read/write poles;

a magnetic material, a portion of said material being connected between said common pole and a corresponding one of each of said read/write poles to form a plurality of read/write transducers each having a front gap defined by said read/write conductor adjacent said magnetic medium and having a back gap spaced away from said magnetic medium;

a plurality of erase poles, said erase poles being mounted in a row adjacent said common pole with said common pole betweem said row of erase poles and said row of read/write poles, said erase poles being spaced so that each portion of the magnetic medium which moves past the space between the read/write poles, moves past a corresponding one of said erase poles;

an erase conductor, said erase conductor being mounted between said common pole and each of said erase poles; and a magnetic substance, a portion of said substance being connected between said common pole and a corresponding one of each of said erase poles to form a plurality of erase transducers each having a gap defined by said erase conductor adjacent to said magnetic medium.

6. A multitrack recording head as defined in claim 5 wherein:

said magnetic substance between said common pole and each of said erase poles forms a plurality of erase transducers each having a front gap defined by said erase conductor adjacent to said magnetic medium and having a back gap spaced away from said magnetic medium.

* * * * *